July 24, 1934. F. PONTON 1,967,724
MEAT AND BONE CUTTING MACHINE
Filed Jan. 30, 1933 2 Sheets-Sheet 2
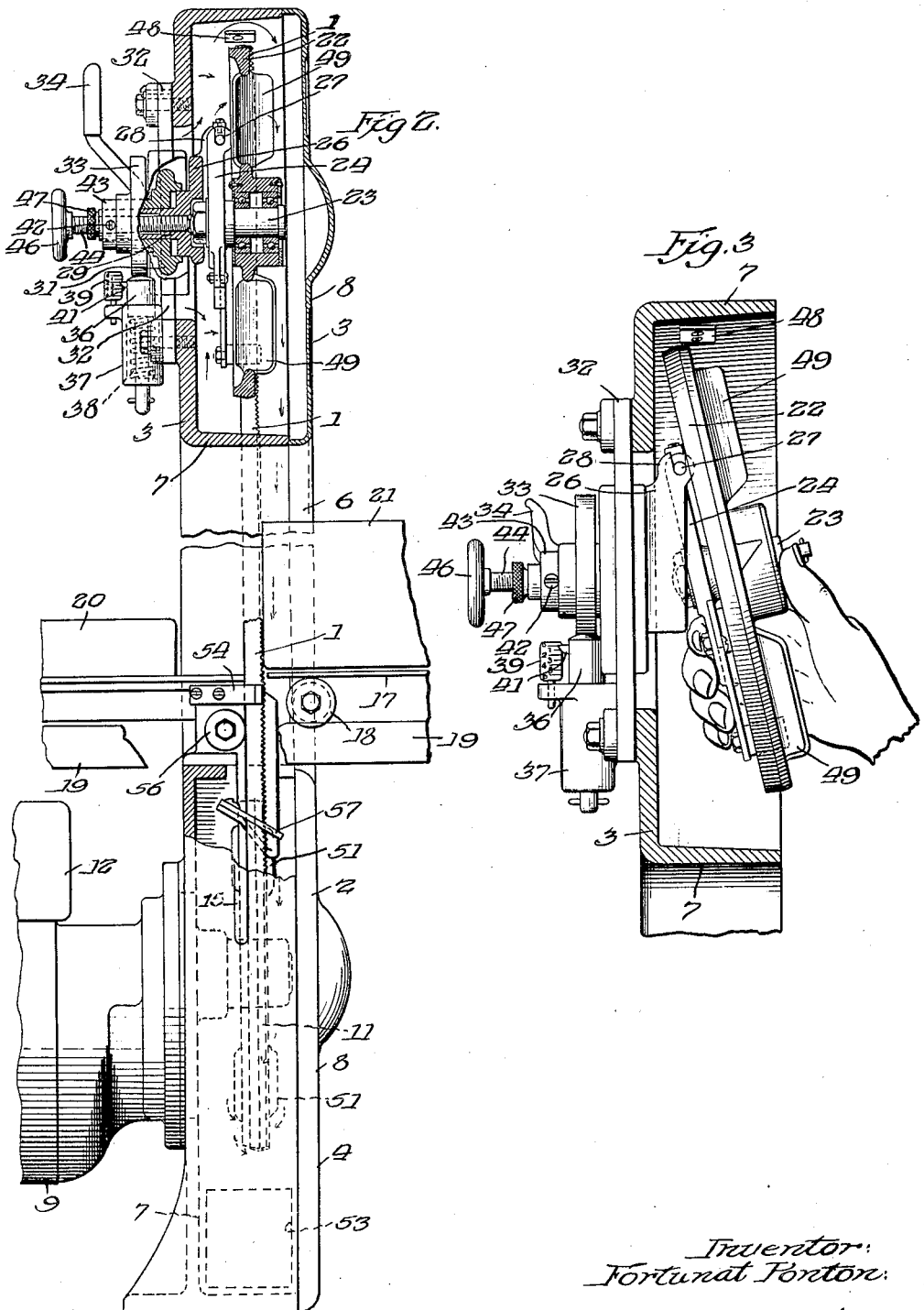

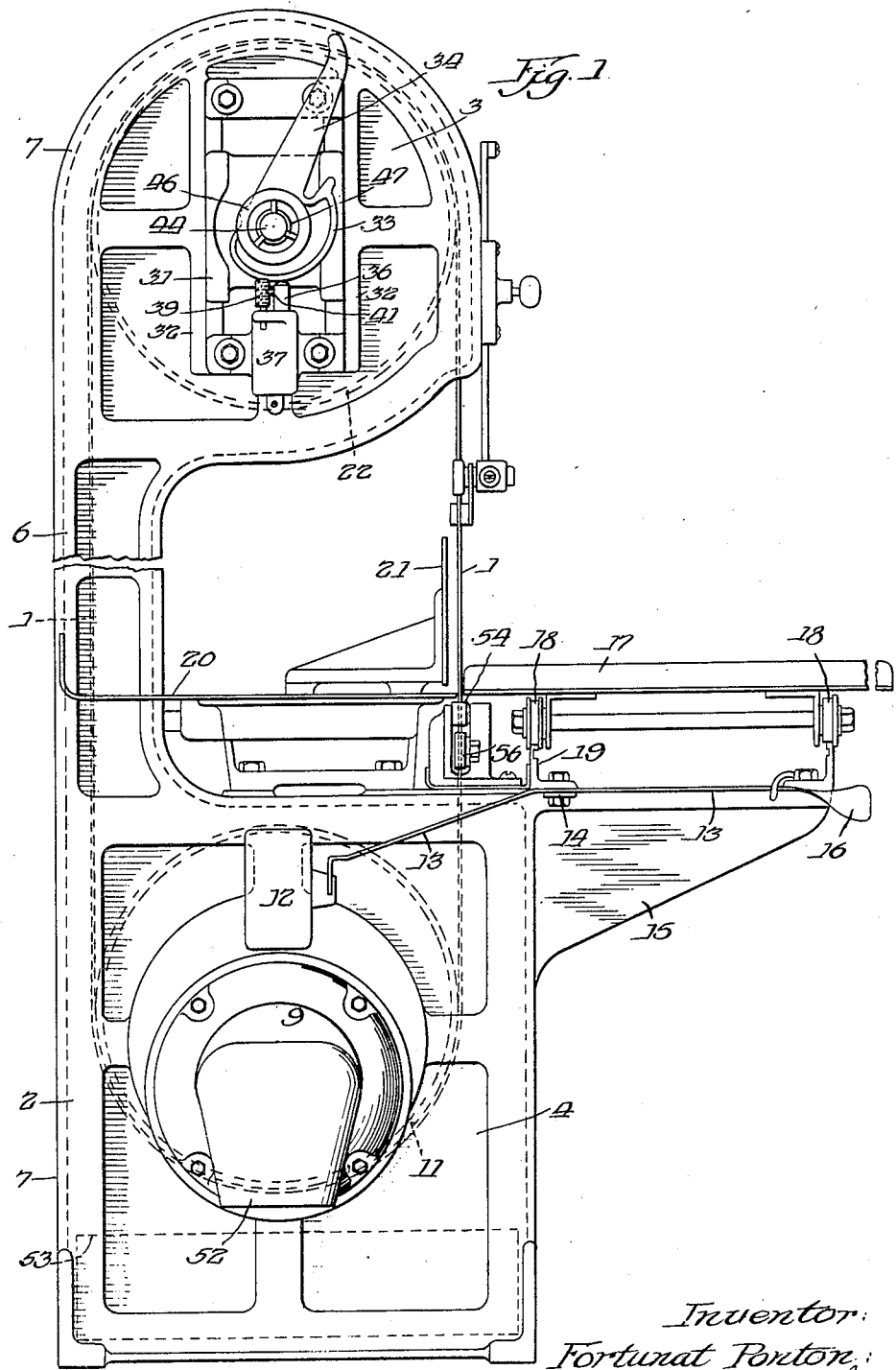

Patented July 24, 1934

1,967,724

UNITED STATES PATENT OFFICE 1,967,724

MEAT AND BONE CUTTING MACHINE

Fortunat Ponton, Chicago, Ill., assignor to Vaughan Company, Chicago, Ill., a corporation of Illinois Application January 30, 1933, Serial No. 654,149

3 Claims. (Cl. 143—27)

This invention relates to meat and bone cutting machines of the type disclosed in the patent to J. W. Vaughan No. 1,511,788 issued October 14, 1924.

Machines of this character which generally employ band saws as the cutting tool are particularly well adapted to cut up sections of meat into smaller portions or even such cuts as steaks, chops, etc., but as previously constructed have the inherent disadvantages of being cumbersome, difficult to adjust, and difficult to maintain clean.

It is the purpose of this invention therefore to provide a machine of this character which is small, compact, readily adjustable for all purposes, and easily kept clean.

In accordance with this invention the upper wheel is so mounted that it may be, if desired, adjusted vertically, horizontally and angularly, and also readily removed by merely raising the wheel after the saw blade is removed. Furthermore, means are provided whereby the saw blade may readily be placed under and maintained at a uniform tension upon the saw blade wheels regardless of its length and the relative tension indicated, at a point exterior of the machine and during operation thereof. The invention also provides means for preventing the sawdust from adhering to all parts of the machine and for directing substantially all of the sawdust to one location from which it may readily be removed. It is also within the contemplation of this invention to provide a control for the machine which may be actuated by the body or leg of the operator, thus permitting full use of both hands for handling the meat, which control however is protected from operation at improper times.

Other novel features and their resultant advantages and a better understanding of this invention may be obtained from the following description given in connection with the drawings, in which one illustrative embodiment is shown, and in which:

Fig. 1 is a rear elevation of a meat and bone cutting machine constructed in accordance with this invention;

Fig. 2 is a side elevation of the upper portion partly in section to illustrate the interior construction thereof; and Fig. 3 is an enlarged detail of the upper portion of the machine partly in section illustrating the manner of removing the upper wheel.

Referring more particularly to the drawings, the machine is of the type employing a continuous band saw 1 and comprises a frame 2 having an upper wheel casing or end portion 3, and a lower wheel casing or end portion 4 connected to the upper portion by a central intermediate restricted portion 6. The entire frame is flanged laterally as at 7 throughout the entire periphery of the frame to provide a recessed frame or casing for housing both wheels and one stretch of the saw blade. The open side of the frame or casing is closed by means of a single door 8 (Fig. 2) hinged upon one side thereof to the frame and which extends the full length of the frame.

Secured to the other side of the frame at its lower end is the driving motor 9 which extends through the frame and into the casing formed thereby to drive a lower wheel 11 rigidly journalled in the lower end portion 4 of the casing. The motor is controlled by a switch 12 which in turn is actuated by a lever 13 pivoted intermediate its ends as at 14. The operating end extends outwardly beneath the work table support 15 and projects slightly beyond the outer edge thereof, terminating in a handle portion 16. Upon the work table support 15 is mounted the usual work table 17 movable upon rollers 18 which engage tracks 19 secured to the work table support.

Attached to the frame upon the opposite side of the blade from table 17 is a fixed table 20. On this table is adjustably secured a meat gauge 21 which is adjustable to and from the blade and also rotatable about its adjusting screw to a position below tables 17 and 20 to permit splitting of large sections of meat.

The overhang of the work table is sufficient to prevent movement of lever 13 by engagement with handle 16, as can be seen from Fig. 1, unless the work table is in retracted position, as shown in Fig. 2. In other words the operator will have to move work table 17 back to retracted position before he can throw switch 12 by contacting handle 16 with his body or knee. It has been found that this feature provides for much needed safety around a band saw type of machine.

The upper wheel 22 is disposed within the upper end portion 3 of the casing and is mounted for vertical, horizontal and angular adjustment. The wheel is journalled upon a stud 23 secured to and projecting from one side of a carrier 24. The carrier is pivotally hooked to an arm 26 by means of a horizontal pin 27 secured to the carrier 24 and seated in two slotted lugs 28 formed in the upper part of the arm 26.

Arm 26 is provided with an integral hub 29 which is adjustable horizontally in a slide 31 mounted for vertical movements on guides 32 secured to the exterior of the upper end 3 of the casing and is restricted against horizontal movements thereby. Arm 26 and the slide 31 constitute a vertical sliding support for the carrier 24 which is pivotally and removably connected thereto.

Secured to slide 31 is a cam 33 provided with handle 34, which cam engages a plunger 36 extending into a socket 37 attached to the upper end of the casing. Plunger 36 is urged upwardly by a spring 38 and consequently urges the upper wheel upwardly away from the lower wheel. The force with which the upper wheel is urged away from the lower wheel may be varied and accordingly the tension of the saw blade varied by rotation of cam 33. The relative tension upon the blade, that is, the degree of compression of spring 38, is indicated externally of the machine by means of a scale 39 attached to socket 37 attached to the frame and a pointer 41 projecting laterally from plunger 36.

Horizontal adjustment of wheel 22 to compensate for any variations in castings is made by sliding hub 29 horizontally in slide 31. A set screw 42 is threaded into and projects through the end 43 of the slide 31 to engage hub 29. This set screw serves the dual purpose of locking hub 29 in its adjusted horizontal position and of retaining cam 33 in adjusted axial position on slide 31.

Angular adjustment of wheel 22 and carrier 24 about pivot pin 27 is obtained by means of an adjusting stem 44 threaded into and projecting through hub 29 and engaging spindle 23. Stem 44 is provided with an operating handle 46 and a lock nut 47 to maintain the stem in its adjusted position.

The wheel may therefore be tilted about pin 27 as an axis by screwing stem 44 inwardly or outwardly by means of handle 46 and locking it in adjusted position by means of lock nut 47.

Whenever desired for cleaning purposes or for changing blades, the upper wheel spindle and carrier can be detached after the blade is removed by merely tilting the bottom of the wheel outwardly as shown in Fig. 3 and raising the wheel to clear pin 27 of the slots in lugs 28. The wheel and associated parts may then be removed entirely from the machine. To limit the upward movement of the wheel and to deaden the sound, in event that a blade should break in operation, a bumper 48 is attached to the inner surface of the upper portion of flange 7 immediately above the wheel. This bumper may be of any suitable material for this purpose.

The entire wheel assembly may be adjusted vertically by rotating cam 33 by means of handle 34. The cam is so designed as to remain in adjusted position, that is, the eccentricity is not so great as to cause it to slide upon plunger 36. By means of this arrangement and the indicating means 39 and 41, the wheel may be adjusted to place the same tension on different saw blades or to maintain the same tension on any one blade, should it stretch. A mere glance at the indicator will show whether the saw is under the desired tension. The indicator may be graduated in pounds or may be graduated to indicate relative degrees of tension.

Most of the material which this machine is especially well adapted to cut, such as meat and bones, contains some fat which causes the sawdust, usually meat, bone and fat dust, to stick and cling to all walls of the casing and to the moving parts. I have discovered that by cooling the parts and creating a flow of air through the casing in a proper direction the sawdust may be directed to substantially one region and there collected. Accordingly there is provided a cooling means for maintaining the temperature of the sawdust below its melting or sticky point and for directing a flow of air in such direction as to localize the sawdust.

For this purpose the spokes 49 of the upper wheel 22 and the spokes 51 of the lower wheel 11 are formed as fan blades, the spokes 49 being shaped to draw air in from the left (Fig. 2) and direct it against the inner surface of the door 8 which deflects the air and sawdust carried thereby downwardly where it is thrown inwardly toward the inner surface of the casing by the blades 51 of the lower wheel. This latter wheel draws in air through the motor which is provided with the usual cool air duct 52. The sawdust then drops by gravity to the bottom of the casing where it may be collected in a pan 53 if desired. I have found that the provision of this cooling and air circulating means maintains the sawdust in such condition that it will fall downwardly and collect at the bottom of the casing. What particles do adhere to the moving parts and casing surfaces may readily be brushed away, whereas heretofore it was necessary to scrub and sometimes scour the machines with hot water to remove the fatty and warm sawdust.

A combination saw guide, thrust bearing and wheel guard is attached to the frame and comprises a pair of saw guide blocks 54 between which the saw blade passes, a thrust roller 56 disposed behind the blade and a wheel guard 57 which directs any sawdust and cuttings away from the lower wheel. Otherwise the sawdust or cuttings may collect upon the periphery of the wheel, increase its diameter and otherwise interfere with the proper tracking of the saw blade.

Further description of the operation of the illustrated machine is not believed necessary. It follows from the foregoing description that the invention provides for a compact machine which may readily be controlled by movement of the operator's leg or body, leaving both hands free for work, and that the upper wheel is readily removed if ever necessary by a single operation without the necessity of any tools. The tension device for creating and maintaining tension upon the saw blade permits rapid change of blade, if necessary, and provides for uniform tension regardless of stretch or size of blade, and thus insures longer life of the blade. The machine is exceedingly accessible for cleaning, and the air cooling and circulating means eliminates substantially all of the dirt around the upper portions of the machine and localizes it in the bottom of the machine.

Other novel features will be apparent to those skilled in the art to whom it will also be obvious that many changes may be made in the details of construction without departing from the spirit and scope of my invention as defined in the following claims:

I claim:

1. In a meat and bone cutting machine, the combination of a frame structure provided with a vertically arranged guideway, a slide adjustably mounted in said guideway, a cam rotatably mounted on said slide, a spring pressed plunger mounted on the frame structure in position to engage said cam and thereby yieldingly support said slide in a position determined by the adjustment of said cam, a supporting arm having a hub seated in a bore formed in said slide and held by said slide against rotation, said arm being provided with slotted lugs above the plane of said hub, a carrier pivotally and detachably supported by said lugs, a saw supporting wheel journaled on said carrier, a stem threaded through said hub and abutting said carrier whereby the angular position of the carrier may be adjusted by manipulation of said stem, a fixed saw supporting wheel, and a saw blade trained over said wheels.

2. In a meat and bone cutting machine, the combination of a frame structure provided with a guideway, a slide adjustably mounted in said guideway, a cam adjustably mounted on said slide, a spring pressed plunger mounted on the frame structure in position to engage said cam and yieldingly support said slide in a position determined by the adjustment of said cam, a supporting member carried by said slide, a carrier pivotally and detachably supported by said member, a saw supporting wheel journalled on said carrier, a stem threaded through said supporting member and abutting said carrier whereby the angular position of the carrier may be adjusted by manipulation of said stem, a fixed saw supporting wheel, and a saw blade trained over said wheels.

3. In a meat and bone cutting machine, the combination of a frame structure provided with a guideway, a slide movably mounted in said guideway, an adjusting cam mounted on said slide, means carried by said frame structure for yieldingly supporting said slide in a position determined by the adjustment of said cam, a supporting member carried by said slide, a carrier pivotally and detachably supported by said member, a saw supporting wheel journalled on said carrier, adjustable means carried by said slide whereby the angular position of the said carrier may be adjusted, a fixed saw supporting wheel, and a saw blade trained over said wheel.

FORTUNAT PONTON.